July 4, 1933.                D. M. SHALER                  1,916,773
                        CEREAL CUTTING MACHINE
                    Filed Sept. 8, 1930        4 Sheets-Sheet 1

Inventor
D. M. Shaler,
By Clarence A. O'Brien
Attorney

July 4, 1933.   D. M. SHALER   1,916,773
CEREAL CUTTING MACHINE
Filed Sept. 8, 1930   4 Sheets-Sheet 2

Inventor
D.M.Shaler,
By Clarence A.O'Brien
Attorney

July 4, 1933. D. M. SHALER 1,916,773
CEREAL CUTTING MACHINE
Filed Sept. 8, 1930 4 Sheets-Sheet 3

Inventor
D.M.Shaler,
By Clarence A.O'Brien
Attorney

July 4, 1933. D. M. SHALER 1,916,773
CEREAL CUTTING MACHINE
Filed Sept. 8, 1930 4 Sheets-Sheet 4
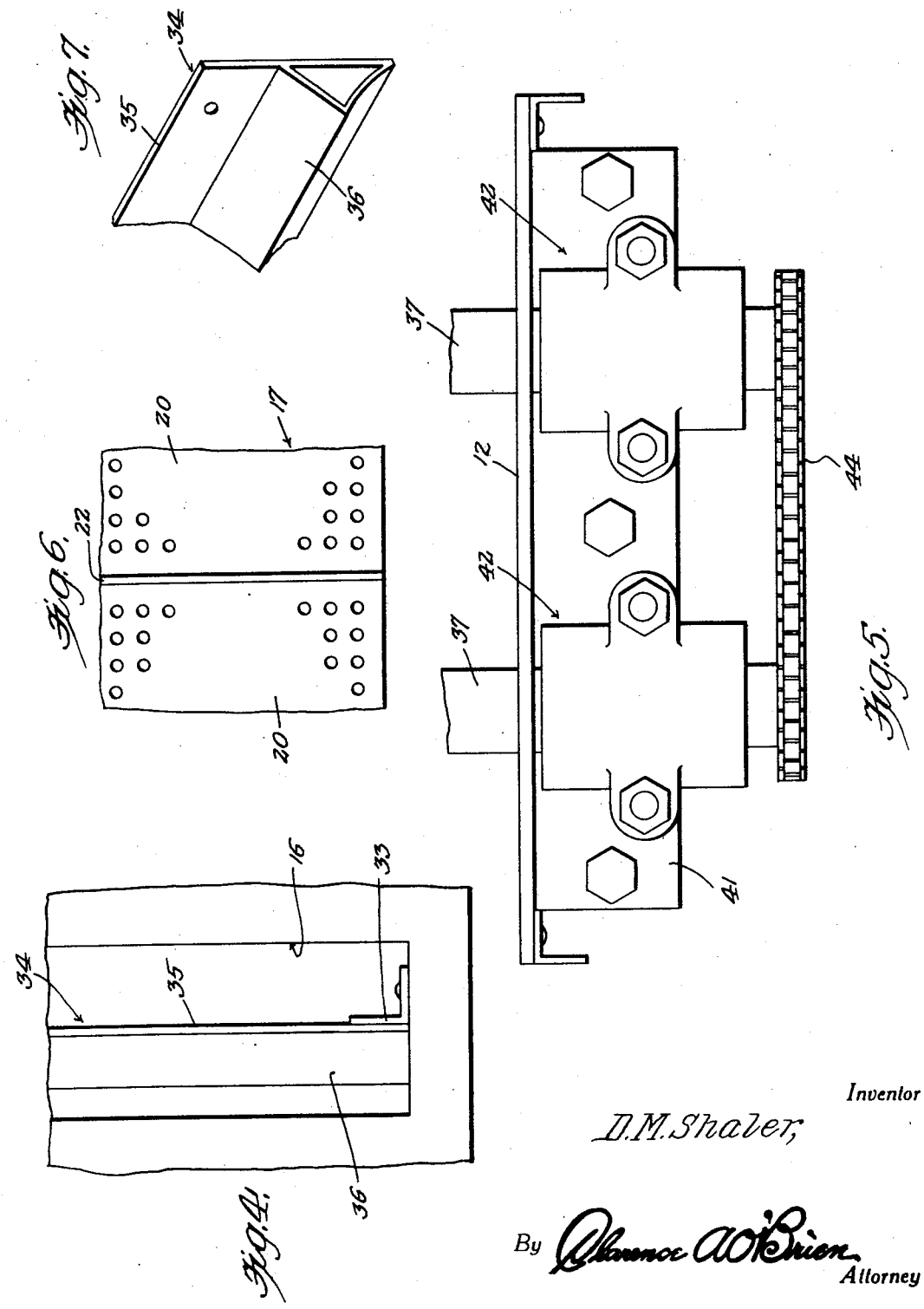
Inventor
D. M. Shaler,
By Clarence A. O'Brien
Attorney Patented July 4, 1933

1,916,773

UNITED STATES PATENT OFFICE

DAVID M. SHALER, OF PLATTE CITY, MISSOURI

CEREAL CUTTING MACHINE

Application filed September 8, 1930. Serial No. 480,502.

This invention relates to an improved rotary cutter which is especially designed for cutting such materials as grains, bark, spices, herbs, and analogous products to reduce the same to a desired, uniform size, accompanied by a minimum of waste product.

In carrying the invention into effect, I have developed a machine having cutting mechanism which while efficiently and cleanly cutting the material to be acted upon, avoids pulverizing the same, so as to reduce the same to the desired uniform size, without creating a large amount of smalls and powder.

All similar machines known to me are made with bladed rotors running in cutting relation to stationary knives in a cage, in such a way that the material to be cut and reduced in size is thrown against the cage and against the stationary knives with such force that the material is wastefully pulverized and then packs around the stationary knives and impairs their efficiency. In addition, such machines have their stationary knives in such positions, that when the cutting blades come into cutting relation thereto, the cutting edges stand at an undesirable angle so that the material is unduly mashed and broken instead of being cleanly cut, as the material is in the machine of my invention.

The machine of my invention differs from other machines of its general type by using two or more sets of bladed rotors, which co-act with each other rather than with stationary knives, to achieve the cutting effect. When the material to be cut enters the machine of my invention, a major portion thereof is permitted to pass directly and unobstructed to the central portion of the machine, where the cutting blades of the rotors come into cutting relation.

In my machine, when the rotors are in the cutting relation, their knives or blades are in the same plane and the cutting faces of the opposed ends of the blades are parallel, so as to achieve a true shearing action. There are no obstructions to the passage of the material around the inside of the cage enclosing the rotors, under the action of the rotors, so that the pulverizing effect of impact and bombardment common to other types of these machines is eliminated and the production of fines and flour is thereby limited to a minimum.

It is to be observed that there is a considerable space between the peripheries of the rotors and the interior walls of the cage.

Other objects and advantages of my invention will be apparent from a reading of the following description of the drawings, wherein for purposes of illustration I have shown a preferred embodiment of the invention.

In the drawings:—

Figure 4 is a top plan view of a portion of the device showing the material inlet.

Figure 5 is a top plan view of the sprocket chain drive connection between the rotor shafts.

Figure 6 is a top plan view of the central portion of the cage forming screen.

Figure 7 is a perspective view of baffle means employed.

Figure 1:
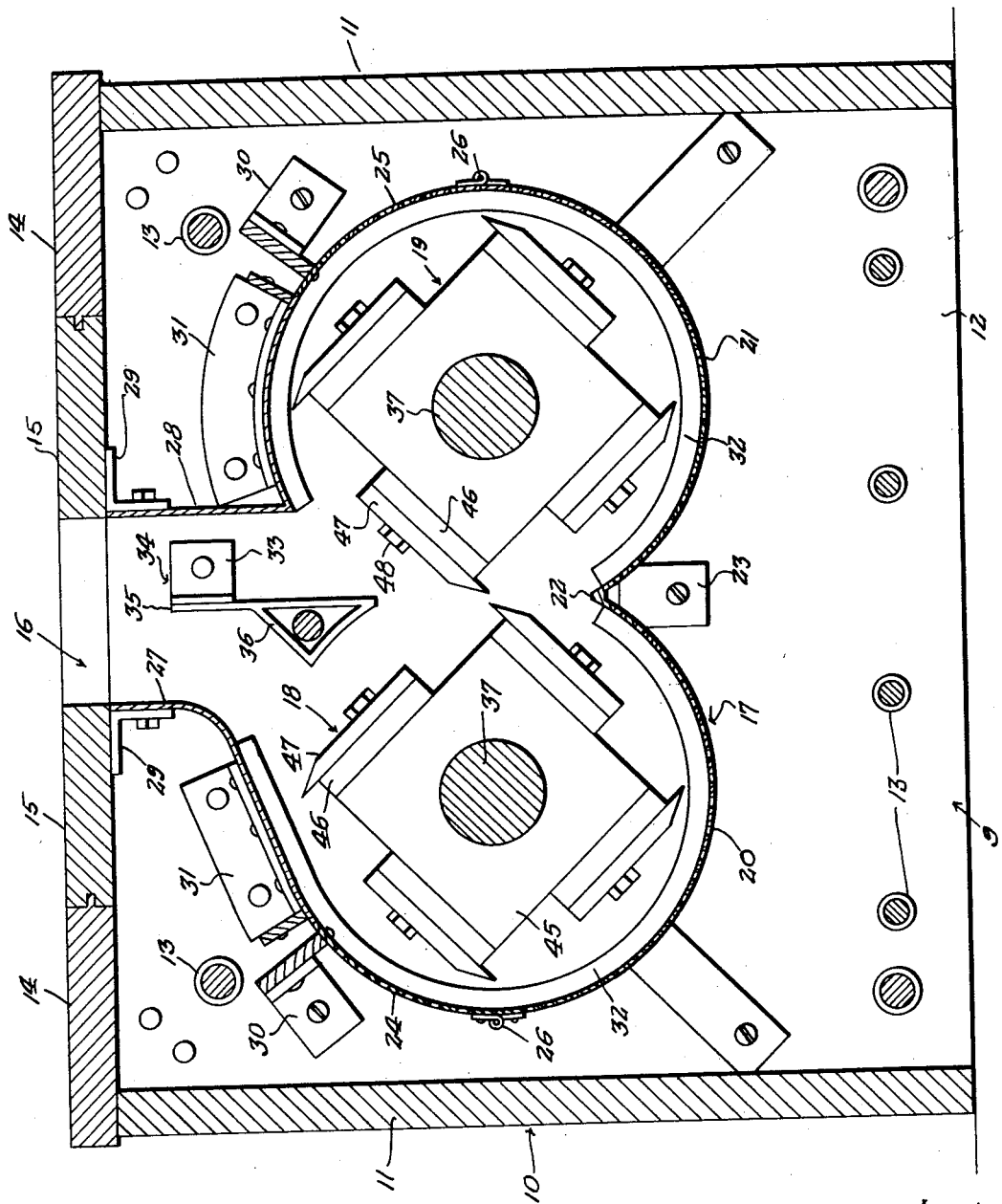
Figure 1 is a view in section and elevation showing the casing and the arrangement of the rotors therein.

Referring in detail to the drawings, wherein like numerals refer to like parts throughout the same, the numeral 8 generally designates the base frame of the machine which is provided with a suitable material outlet opening 9. Supported on the base frame 8 is an appropriate casing structure generally designated 10, which is composed of side walls 11 and end walls 12 assembled together by means of tie rods 13 suitably located for properly positioning and maintaining the walls and the interior mechanism of the machine. The top of the casing is of sectional construction and embodies tongued and grooved companion sections 14 and 15 arranged to define a material intake opening 16.

Supported on the side walls 11 within the casing is a cage designated 17, having cooperating lower half sections defining an individual compartment for each of a pair of bladed rotors 18, 19, respectively. The lower part of the cage includes a pair of arcuate portions 20 and 21 adjoined together through the medium of a dividing rib 22. The numeral 23 designates supporting plates located adjacent the crotch defined by the juncture of the portions 20, 21.

The numerals 24 and 25 designate the upper arcuate portions which are joined to the upper ends of the arcuate portions 20 and 21 by means of hinges 26. It will be noticed that the terminal of the portion 25 is downwardly directed, the portion 25 being uniformly curved throughout its length. The portion 24, however, has a portion which is upwardly directed to a position of greater elevation than the portion 25. Vertical walls 27 and 28 on the termini of the portions 24, 25, respectively, form a material intake chute which is registered with the intake opening 16 in the sectional top of the casing. The portions 24, 25 as well as the walls 27, 28 are equipped with brackets 29 for mounting them in the casing. Mounted on the side walls 11 of the casing are appropriately curved supporting bars 32 around which the reticulated portions of the cage extend. The portions 24, 25 are composed of the reticulated hinged portions to which the removable brackets 30 are secured, and the unperforated upper portions to which the brackets 29 are secured. The walls 27, 28 are unperforated.

Within the material intake chute and below the upper end of the walls 27, 28 is a material dividing member 34 which depends into the cage to a point between and close to the sphere of action of the rotors therein. The member 34 is carried by brackets 33 secured to the side walls 11 of the casing and comprises a vertical plate 35 having on the side thereof adjacent the portion 24 of the cage, a triangular laterally projecting baffle 36 arranged to deflect incoming material toward the same side of the cage. The other side of the plate 35 is plain and offers no obstruction to the passage of the material to a point central of the casing and between the rotors.

Figure 2:
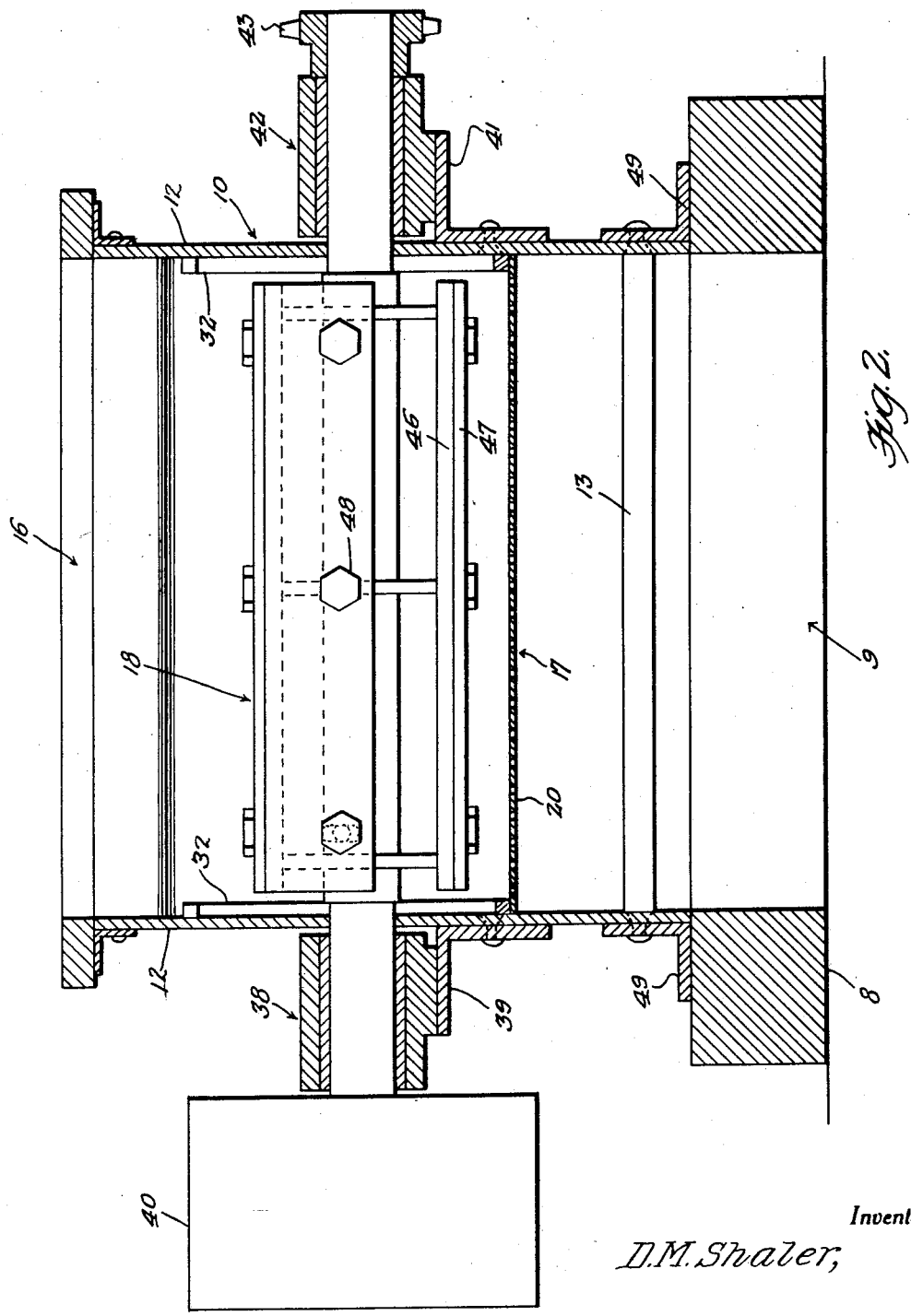
Figure 2 is a sectional view taken at right angles to the structure as shown in Figure 1.
Figure 3:
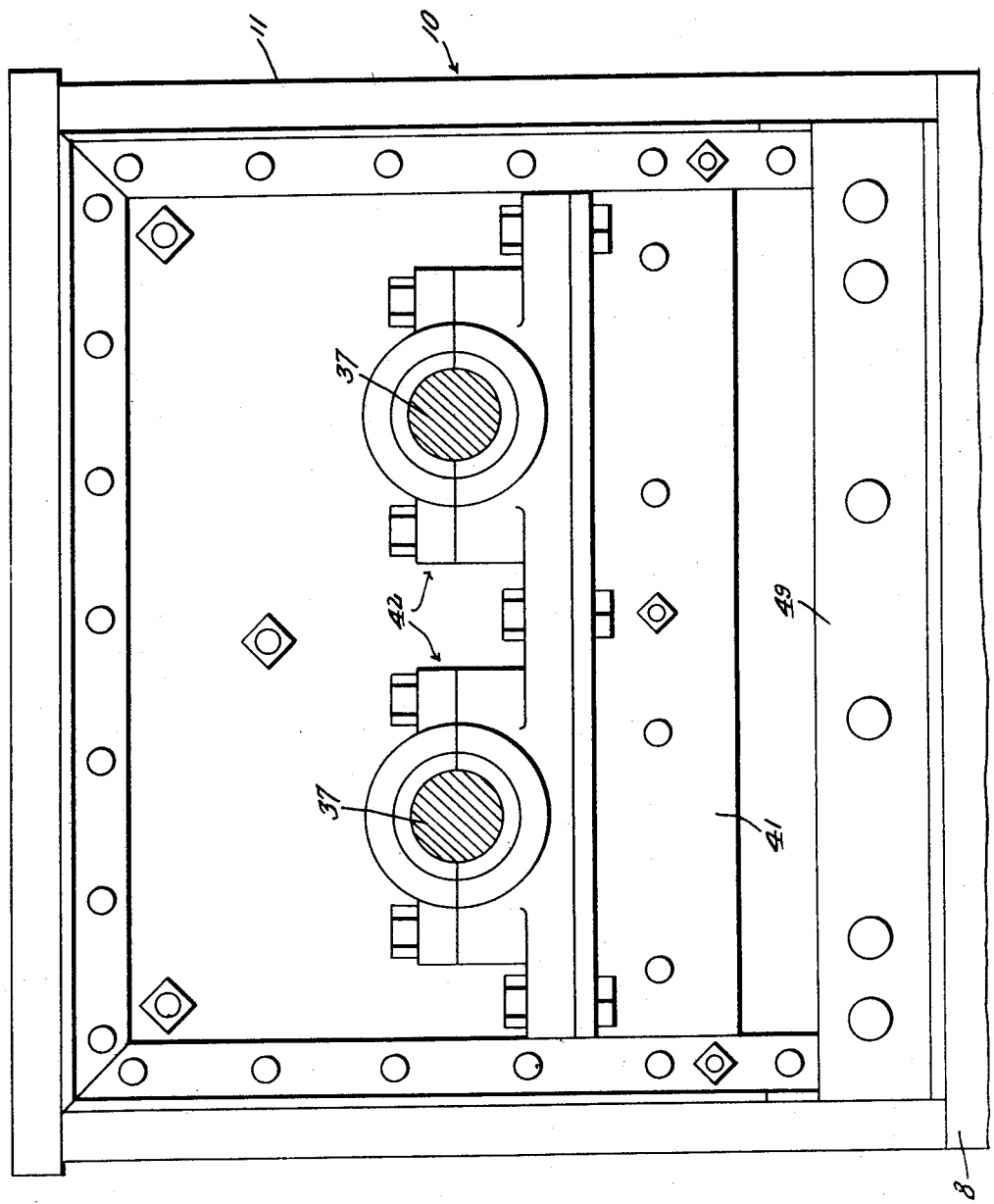
Figure 3 is a sectional view showing in elevation the right hand end of the structure which is shown in Figure 2.

The rotors 18 and 19 are of identical construction. Each rotor embodies a shaft 37 whose opposite ends are journaled in bearings 38 and 42 located outside of the casing as shown in Figure 2. The bearings 38 and 42 are supported on angle brackets 39 and 41 secured to the outside of the casing. The numeral 40 designates a power supply pulley on one of the rotor shafts.

At the side of the casing opposite the power pulley 40 the rotor shafts are provided with sprocket wheels 43 carrying a sprocket chain 44 which operatively connects them for rotation in the same direction. Mounted on the shaft 37 are longitudinally spaced, squared heads 45 to the radially outward edges of which are secured the narrow blade supporting bars 46. On the radially outward side of each bar 46 is adjustably mounted a flat, plain blade 47 which is secured by bolts 48 to the bars in such a way that the blade may be adjusted to project at different distances from the rotor. The outward side of the cutting end of the blade is beveled, rather than the radially inward side, to provide an inwardly located cutting edge. Attention is called to the fact that the bevel produces a face on the cutting end of the blade which is substantially normal to a diameter of the rotor so that when the blades of the rotor come into cutting relation, these faces are parallel. The rotation of the rotors 18, 19 in the same direction shown in Figure 1, brings the cutting edges of opposed blades into cutting relationship at a point substantially in the same plane and between, the dividing rib 22 and the lower end of the dividing member 34.

The arrangement of the rotors whereby the cooperative position of their blades as described above is achieved, is such that as the blade of the rotor 18 moves upwardly toward the cutting sphere between the dividing member 34 and the rib 22, and the related blade of the rotor 19 moves downwardly toward the cutting sphere, the cutting edges of the blades, located at the radially inward sides of the blades, are in advance. This produces a true shearing action between the blades which commences as soon as they start to move into opposition so that there is no preliminary crushing and rending or hammering of the material being handled between cooperating blades, such as takes place in arrangements of blades in which the cutting edges do not act as soon as the blades come into opposition. The result is a clean shearing or cutting of the material with a minimum of pulverization and smalls. Due to the construction of the cage and the spacing which is provided between the rotors and the cage, subsequent pulverization and fracture of the sheared particles by the agitation in the cage, is held to a minimum.

It will be understood that the material to be cut is introduced into the machine through the material inlet opening 16. The material gravitates through the chute into the cage structure. The dividing member 34 divides the descending material, distributing a part thereof into the central part of the cage and another part thereof into the left hand side of the cage. The material is sheared at the point mentioned and kept in motion by the rotation of the rotors until sufficiently reduced to pass the screen of the cage and discharge through the outlet opening 9 in the base of the machine.

The dividing rib 22 aids in maintaining an even distribution of the material in the cage with respect to the rotors so that a condition in which some of the material is overworked and some underworked will be avoided.

The desirability of assembling the sides and ends of the casing in a knock-down fashion is believed obvious, as well as the disposition of the bearings 38, 42 on the angle brackets 39 and 41 on the outside of the casing. This makes the manufacture and assembly of the machine simpler, and affords the maximum of interior capacity in the machine, and eliminates clogging of the bearing by accumulations in the interior of the casing. The sectional construction of the top is advantageous from a manufacturing standpoint, and it also facilitates making adjustments and repairs to the mechanism of the machine.

Though I have shown and described herein a preferred embodiment of the invention, it is to be definitely understood that I do not desire to limit the application of the invention thereto, and any change or changes may be made in material and structure and arrangement of parts, within the spirit of the invention and the scope of the subjoined claims.

Having thus described my invention, what I claim as new is:—

1. In a cutting machine of the class described, in combination, a casing, a foraminous cage structure mounted therein and including a horizontally disposed lower part embodying substantially segmental curved portions adjoined together through the medium of a material dividing and separating rib, said cage also including upper curvate portions hingedly connected to the opposite ends of said lower horizontal parts, and said upper portions terminating in spaced parallel vertically disposed walls, said casing embodying an inlet associated with said walls, and said walls defining a material intake chute, for feeding the material into the central portion of the cage, and rotary cutters mounted in said cage, and a baffle located in said chute consisting of a dividing plate and a substantially V-shaped projection constituting a baffle, said plate and baffle being disposed at a point above the aforementioned rib for the purpose stated.

2. In a cutting machine of the class described, a casing having a material inlet, a foraminous cage structure in the casing including a generally horizontally disposed lower portion embodying arcuate segments, a rib disposed between and connecting the adjoining portion of the arcuate segments for dividing and separating material introduced into the cage structure, upper hinged sections connected to the opposite ends of the lower portion, said upper hinge portions terminating in vertical walls which define with the casing a material intake chute registered with the material inlet in the casing for feeding material into the central portion of the cage, a pair of bladed rotors in the cage, each of said rotors comprising generally tangentially arranged blades the end of each of which is angularly cut-off normal to a diameter of the rotor and define a shearing edge, a baffle member located in the material intake chute, a laterally and angularly directed portion on one side of the baffle member for directing material toward the same side of the cage, said baffle plate being disposed spacedly above the mentioned rib for the purpose specified, opposed blades of the rotors being in the same plane when in full shearing relation their angular ends being then substantially parallel and in a plane which passes through the baffle plate and the mentioned rib.

3. In a rotary cutter of the class described, a casing having a material inlet, a foraminous cage in the casing including a generally horizontal portion composed of arcuate segments, a material separating rib disposed between and connecting the arcuate segments for separating and deflecting material in the case to either side of the cage, upper hinged sections connected to the opposite ends of the horizontal portion, extensions on the hinged sections which define with the casing a material intake chute for conveying material to the central portion of the cage, a pair of bladed rotors in the cage arranged to rotate in the same direction, tangentially arranged blades on the rotors, said blades being provided with an angular cutting end substantially normal to a diameter of the rotor which defines a cutting edge at the radially inward side of the cutting end, said rotors being adapted to be rotated in a direction which brings the cutting edges of the opposed blades first into opposition, said opposed blades being in the same plane and the cutting ends substantially parallel when in full shearing relation, a vertical baffle plate in the chute, an angular member on one side of the baffle plate for directing a portion of the incoming material toward the same side of the cage, said baffle plate being located spacedly above the material separating rib and between the rotors.

In testimony whereof I affix my signature.

DAVID M. SHALER.